United States Patent [19]
Goldberg et al.

[11] 3,757,562
[45] Sept. 11, 1973

[54] METHOD OF IMPACT TESTING A METALLIC STRUCTURE

[75] Inventors: Gerald L. Goldberg; Henry W. Wessells, III, Phila., Pa.

[73] Assignee: The Budd Company, Philadelphia, Pa.

[22] Filed: Oct. 20, 1971

[21] Appl. No.: 190,993

[52] U.S. Cl. .................................................. 73/12
[51] Int. Cl. ............................................. G01n 3/30
[58] Field of Search ................... 73/88 R, 88 A, 12, 73/148

[56] References Cited
UNITED STATES PATENTS
3,513,687  5/1970  Griffin et al. ...................... 73/88 A
2,446,566  8/1948  Wenk, Jr. ............................. 73/88 R

*Primary Examiner*—Jerry W. Myracle
*Attorney*—Thomas I. Davenport et al.

[57] ABSTRACT

A method of testing a metallic structure comprises the steps of providing data relating to the structure, which may be data from a drawing or other source. A scale model of the metallic structure is then made of the metallic structure. The scale model is made of superplastic material having a stress-strain characteristic which is related to the stress-strain characteristic of the metallic structure. The scale model is then subjected to impact or collision testing with the test data acquired being used to determine what the reaction of the metallic structure would be if it were subjected to related impact or collision tests.

5 Claims, 9 Drawing Figures

Patented Sept. 11, 1973

INVENTORS
GERALD L. GOLDBERG
BY HENRY W. WESSELLS, III

Edward M. Farrell
ATTORNEY

Patented Sept. 11, 1973 3,757,562
2 Sheets-Sheet 2
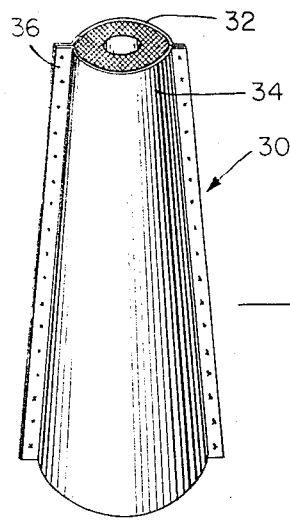
Fig.3
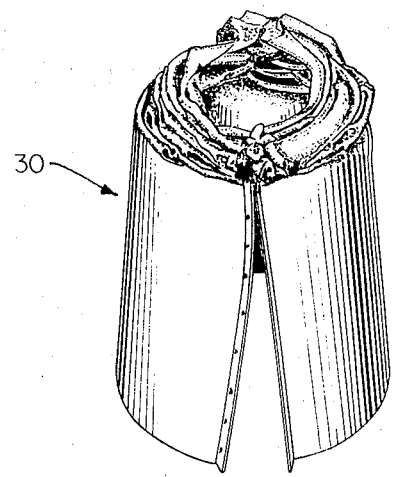
Fig.3-A
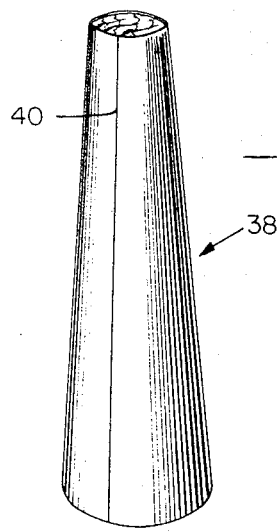
Fig.4
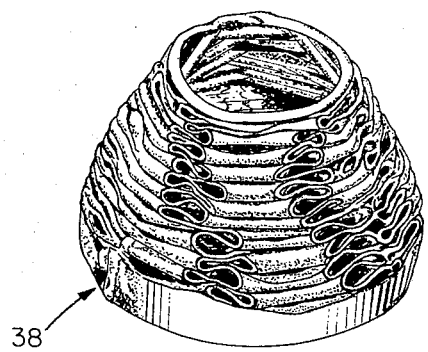
Fig.4-A
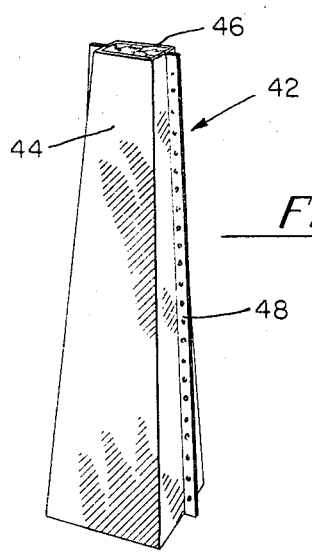
Fig.5
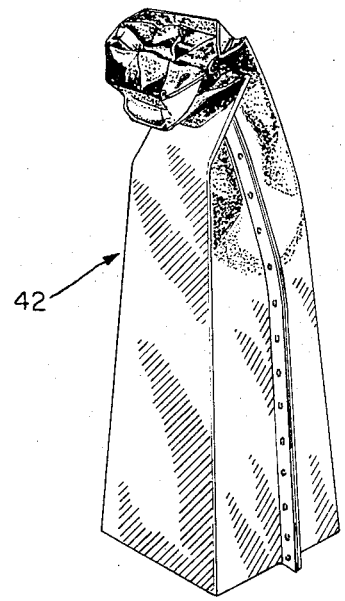
Fig.5-A
INVENTORS
GERALD L. GOLDBERG
BY HENRY W. WESSELLS, III
Edward M. Farrell
ATTORNEY

METHOD OF IMPACT TESTING A METALLIC STRUCTURE

Various methods and apparatus for testing automotive bodies have been used. One example of such testing is described in a patent to W.B. Dean et al; U.S. Pat. No. 3,113,452. This patent, however, does not involve destructive testing as by impact or collision.

Safety standards have been major concerns of the automotive industry in recent years. Adequate testing of structures under impact or collision conditions is especially important. While full size automobiles are sometimes used in final impact tests, it is generally impractical to use completed car bodies or fully designed steel pieces and then subject them to impact testing. Such impact testing generally involves destruction of the pieces and requires great expense in the tooling to form the pieces. Further, the testing to be done generally requires changes in the dimensions and configurations of the pieces during testing until the designs of the pieces are finalized.

One of the main materials used for the car bodies is an autobody grade steel, a cheap material involving high tooling and assembly cost. This is due to the forming technique required and because of the large number of parts required to make sub-assemblies which subsequently have to be joined to make up the final carbody assembly. The expensive tooling involved and the forming techniques make it impractical to use the parts made for impact testing while the parts are in the process of design.

At the present time in making structural models, particularly when handling metal parts, readily formed plastic is generally used. The reason for this is that using plastic allows vacuum-forming or casting of parts relatively inexpensively. However, because the parts are made of plastic, the testing of the parts is limited to static or vibratory structural analysis. The inherent nature of the plastic materials is that they do not model the stress-strain curve of commonly used metals. In addition, plastics are usually brittle materials. Therefore, they are not capable of exhibiting the characteristics of these metals under yielding, impact, or gross deformation type loading.

Various types of superplastic materials are presently being used. A superplastic material is generally one having unusual ductility, in the sense that only comparatively small deforming forces are required to produce substantially uniform deformation throughout the volume of the material without incurring high stresses such as would ordinarily reach the breaking point of the material. Although superplastic material may include various types of crystalline materials, the subject invention is primarily directed toward superplastic materials involving metals. While superplastic material may take a variety of different forms, a well known and commonly used superplastic material involves an alloy of zinc and aluminum, with the zinc comprising approximately 78% of the total alloy. Of course small amounts of other materials may be used in the superplastic material.

The zinc-aluminum alloy range, typically 78% zinc and 22% aluminum exhibits superplasticity at 260-270C, and has useful mechanical properties at normal temperatures. Tensile strengths up to 40,000 psi are attainable with acceptable elongation after forming. The modulus of $9 \times 10^6$ is about one third that of steel, but is similar to aluminum alloys and ten times higher than that of many plastics.

It is an object of this invention to provide improved methods for structurally testing metallic components.

It is a further object of this invention to provide improved methods of impact testing metallic structures used in a vehicle relatively economically and without the need to build and destroy the structures to be tested.

In accordance with the present invention, a method of testing a metallic structure comprises the steps of first providing a representation of the metallic structure. A forming die is dimensioned to form a scale model of the metallic structure to be tested. Superplastic material is then heated to a superplastic condition. Deforming forces against the forming die deform the superplastic material to conform to the general shape of the forming die. The superplastic material is then cooled. The superplastic material has stress-strain and other characteristics which are related to the metallic structure to be tested. These characteristics may include the modulus of elasticity, elastic limit, density, energy absorption and structural failure characteristics. After the superplastic scale model has been formed, it is subjected to collision or impact testing. The actual part tested is then inspected to obtain data which is related to the metallic structure to determine what the effects of impact or collision would be on the metallic structure if it were tested in a manner related to the testing of the superplastic model.

Other objects and advantages of the present invention will be apparent and suggest themselves to those skilled in the art, from a reading of the following specification and claims, in conjunction with the accompanying drawings, in which:

FIGS. 3, 4 and 5 represent metallic structures of different shapes of the types which may be subjected to impact testing;

FIGS. 3a, 4a and 5a represent the structures illustrated in FIGS. 3, 4 and 5, respectively, after they have been subjected to impact tests.

Figure 1:
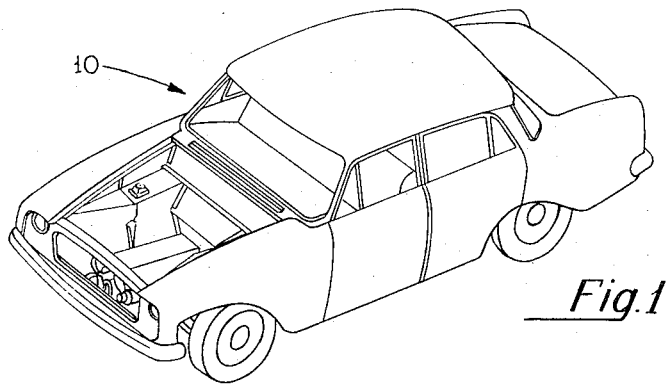
FIG. 1 illustrates a full scale metallic structure in the form of an automobile.

Referring to FIG. 1, a full size automobile 10 may be of the conventional type. For example, the car body construction may be made of steel. In the construction of such an automobile, various forming techniques for the different components are first required. Then a large number of parts are joined together to make sub-assemblies. Subsequently the sub-assemblies are joined by welding or other suitable means to make the final carbody assembly.

In testing various components in an automobile for safety and the like, it has generally been determined that the zones of importance are the front end relative to the cowl, the door frame or frames relative to a sidesill and the floor pan and rear sidesill kick-up over the rear axle relative to the rear sidesill fore and aft of the kick-up location.

In describing the present invention, the various components may be tested separately. However, as previously mentioned, it is not practical to make the actual part and then subject it to destructive testing. The reason for this is that during the testing stage, very often, the dimensions and configuration of the parts to be used in the final designed automobile may involve various changes in design.

Figure 2:
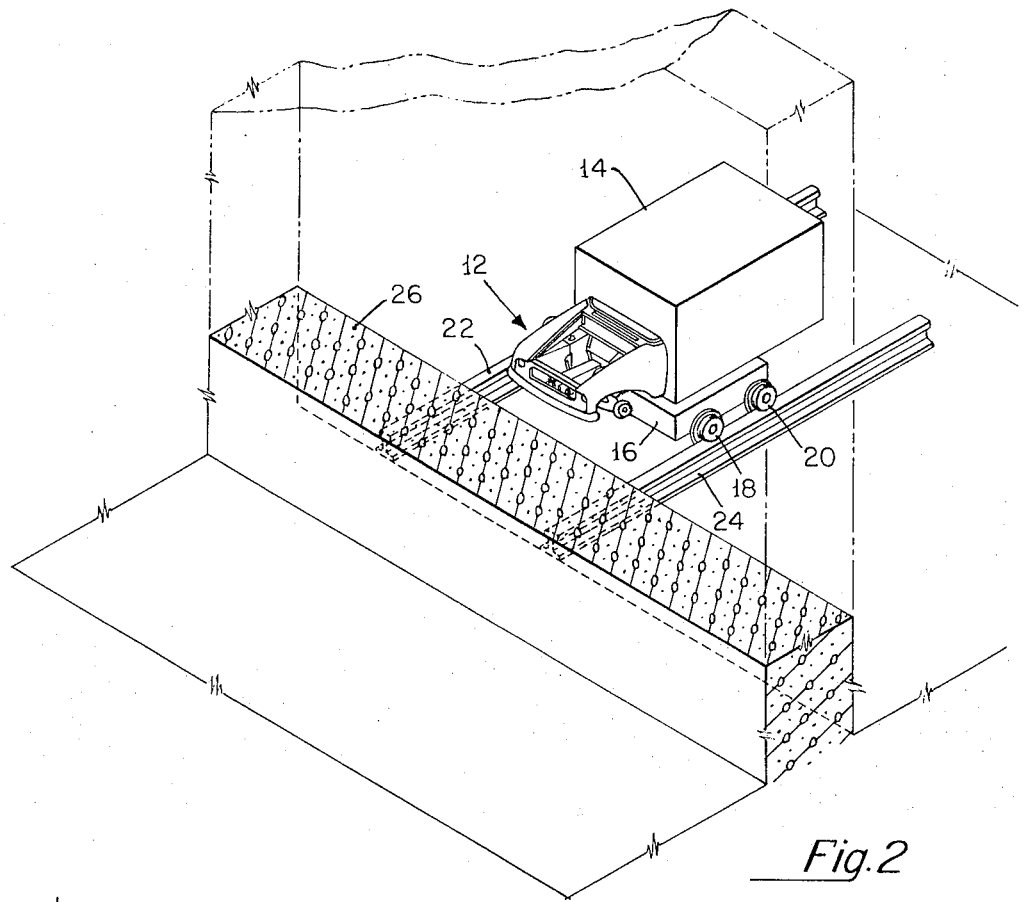
FIG. 2 represents a superplastic scale model of components from the automobile illustrated in FIG. 1 being subjexted to an impact testing operation.

Referring particularly to FIG. 2, a scale model 12 of the front of the automobile is mounted to a block 14. The block 14 is secured to a carriage 16 suitably mounted on wheels 18 and 20. The wheels 18 and 20 are disposed to guide the block on a pair of rails 22 and 24.

The block 20 with its associated scale model front end 12 is adapted to be driven into an obstruction or concrete wall 26. Means for driving the carriage 16 at controlled rates of speed is not illustrated for purposes of clarity since it is only indirectly related to the present invention.

After the front end 12 has been subjected to an impact or collision against the wall 16, it may be examined visually to determine the extent of damage. Alternatively, various measurement instruments may be mounted on or associated with the front end 12 prior to the collision. Such instrument may include strain gauges or other types of transducers capable of generating electrical signals. These signals may be recorded and analyzed by a computer, for example. The data from the scale model may be correlated with data relating to the actual metallic structure of interest to determine what effect a similar type of collision would have on the metallic structure.

The various parts making up the front end 12 are made of superplastic metallic material. As is known, the thermo-forming techniques now practiced in the polymer and glass industries may be employed with equal or greater facility to the shaping and deforming of metals. In considering plastic and glass, the basic process employs a die having a shape that is substantially complementary to the shape desired to be produced. The material to be deformed may be heated to approximately 450° F and placed adjacent the die. Deforming forces are applied to cause the material to stretch and deform into and/or around the die. The final formed product includes detailed contours and complex curvatures as may be required.

Because the dies involved may be of various forms and not necessarily by the types of dies necessary in forming steel, the parts made of superplastic material may involve vacuum techniques and techniques which require low pressures. While relatively high temperatures are employed, this is acceptable in a testing operation although it may not be acceptable in a long production run operation.

Because of the relative cheapness in making the various superplastic parts, the parts involved may be used in self-destruction operations. This makes it ideally suitable for impact and collision testing which is becoming increasingly of more concern in the automotive industries, especially when safety is involved.

In a testing operation, if it is desired to test a metallic steel structure, it is apparent that a superplastic material of precisely the same form, thickness and shape need not be used. However, it is known that there is a co-relationship between the steel and the superplastic material. For example, to obtain equal stiffness panel in superplastic material would have to be about 40 percent thicker than a sheet of steel panel material. The thickness, however, of the superplastic alloy is about 70 percent that of steel so the panel thickness to stiffness ratio is about the same as steel.

When dealing with models of the actual parts, the various ratios between the shapes and thicknesses of the material may not be directly proportional. Also, if a scale model is subjected to a collision or impact test the rate of speed at which the model would be subjected to the impact or collision would be far less than the rate of speed at which the actual metallic structure would be moved during an impact or collision test. However, all of these factors are related to each other so that the data obtained from the model testing can be co-related to an actual part to determine the effects on the actual part during impact testing.

Thus it is seen that after all the various factors relating to the material, shapes, thicknesses and speeds involved, that the data acquired between the metallic structure and the superplastic material would bear a co-relationship with respect to each other. This enables a person to acquire data relating to the actual collision of the metallic structure even though the structure itself is not subjected to the test.

Figure 6:
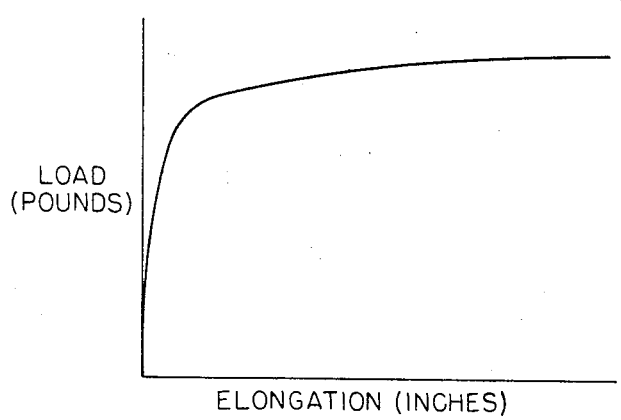
FIG. 6 is a curve illustrating the elongation characteristics of superplastic material plotted with respect to load.

FIG. 6 illustrates a typical curve illustrating the elongation or stress effects of superplastic material as it is elongated under increasing loads. The curve would involve an operation at room temperature with the superplastic material heated to the superplastic condition, for example 450° F. It is noted that this curve is similar to the one which would be obtainable if steel or other similar metals were involved.

In actual practice, scale models of three-eighths the sizes of the actual parts were fabricated and tested. FIGS. 3, 4 and 5 illustrate what the specimens looked like before testing. FIGS. 3a, 4a and 5a illustrate what the specimens looked like after testing.

These parts were tested by inserting the pieces between two members and compressing the members under predetermined pressures. This testing indicated that the parts were crushed in the same manner as similar shaped large size steel pieces.

FIGS. 3 and 3a illustrate a tapered cylindrical shaped structure 30 comprising two similar half sections 32 and 34. Each of the sections include flange portions 36, which may be joined by spot welding.

FIGS. 4 and 4a illustrate a tapered cylindrical shaped structure 38, which is formed by joining the ends thereof by a weld seam 40.

FIGS. 5 and 5a illustrate a tapered rectangular shaped structure 42, in which two similar half sections 44 and 46 include flange portions 48, which may be joined together by spot welding.

The components illustrated in FIGS. 3, 4 and 5 are made of superplastic material. These components may be formed under relatively low pressure and high temperature. After they have been formed they acquire the general characteristics of metal which may be co-related to the steel to be used in automobiles.

FIGS. 3a, 4a and 5a show the various components after they have been subjected to an impact or collision test. These components may form scale model parts of the automobiles to be tested.

An article by Walter A. Backofen entitled "Superplasticity Enhances Metallurgy" in "Steel" magazine, Dec. 15, 1969, pages 25–28, describes some of the ways of forming superplastically. Another article involving the theoretical approach to the impact testing of tubes and experimental verification was written by Anthony P. Coppa, General Electric Company, in a NASA Technical Note entitled "The Buckling of Circular Cylindrical Shells Subject to Axial Impact".

Various studies utilizing computer programs on various steel and superplastic tubes performed under the direction of the inventors indicate that the main material constants of importance in impact are the modulus of elastIcity and density. This is true because the speed of the compression waves and the elastic strain energy of the impacted material are the governing terms in the impact phenomena. It is obvious in impact testing that the material used as a scale model must be able to buckle without shattering. Studies have also indicated that the precise point of yield is relatively inimportant as long as there is a yield point.

What is claimed is:

1. A method of acquiring test data relating to a metallic structure comprising the steps of providing a representation of said metallic structure, providing a forming member shaped to form a scale model of said metallic structure, providing a mass of superplastic metallic material, heating said superplastic material to a superplastic condition, applying a deforming force to force said superplastic material against said member to deform said mass of superplastic material while in a superplastic condition to form a scale model of said metallic structure, permitting said superplastic material to cool to assume stress-strain characteristics related to the stress-strain characteristics of said metallic structure, and subjecting said scale model to an impact testing operation to obtain data co-related to said metallic structure.

2. A method of testing a metallic structure as set forth in claim 1 wherein the step of applying a deforming force comprises applying pressure to said superplastic material.

3. A method of testing a metallic structure as set forth In claim 2 wherein the step of heating said superplastic material comprises heating said superplastic material to approximately 450°F.

4. A method of testing a metallic structure as set forth in claim 3 wherein the step of subjecting said scale model to an impact testing operation comprises moving said scale model at a predetermined rate of speed into colliding contact with an obstacle.

5. A method as set forth in claim 4 wherein an additional step is provided of analyzing said scale model after said impact testing to determine what the effect of a related type of impact testing would have on said metallic structure.

* * * * *